United States Patent [19]
Robichaud et al.

[11] Patent Number: 6,028,289
[45] Date of Patent: *Feb. 22, 2000

[54] LASER PROCESSING OF DISCRETE SHEETS OF MATERIAL

[75] Inventors: Arthur W. Robichaud, West Worthington; Timothy W. Duffy, Dublin, both of Ohio

[73] Assignee: SIG Combibloc Inc., Columbus, Ohio

[*] Notice: This patent is subject to a terminal disclaimer.

[21] Appl. No.: 09/126,820

[22] Filed: Jul. 31, 1998

Related U.S. Application Data

[63] Continuation of application No. 08/902,237, Jul. 29, 1997, Pat. No. 5,843,364, which is a continuation of application No. 08/541,047, Oct. 11, 1995, Pat. No. 5,688,463, which is a continuation of application No. 08/489,547, Jun. 12, 1995, abandoned.

[51] Int. Cl.[7] .................................................. B23K 26/00
[52] U.S. Cl. ...................... 219/121.69; 264/400; 264/482
[58] Field of Search ........................ 219/121.63, 121.64, 219/121.69, 121.8; 264/400, 482

[56] References Cited

U.S. PATENT DOCUMENTS

| | | | |
|---|---|---|---|
| 4,873,415 | 10/1989 | Johnson et al. | 219/121.64 |
| 5,389,761 | 2/1995 | Kresse, Jr. | 219/121.63 |
| 5,688,463 | 11/1997 | Robichaud et al. | 219/121.69 |

*Primary Examiner*—Geoffrey S. Evans
*Attorney, Agent, or Firm*—Standley & Gilcrest LLP

[57] ABSTRACT

A process for performing a laser treatment on discrete sheets of material is disclosed. The present invention provides for shingling discrete sheets of material and for tracking and contacting a laser beam on the continuously moving shingled sheets.

11 Claims, 3 Drawing Sheets

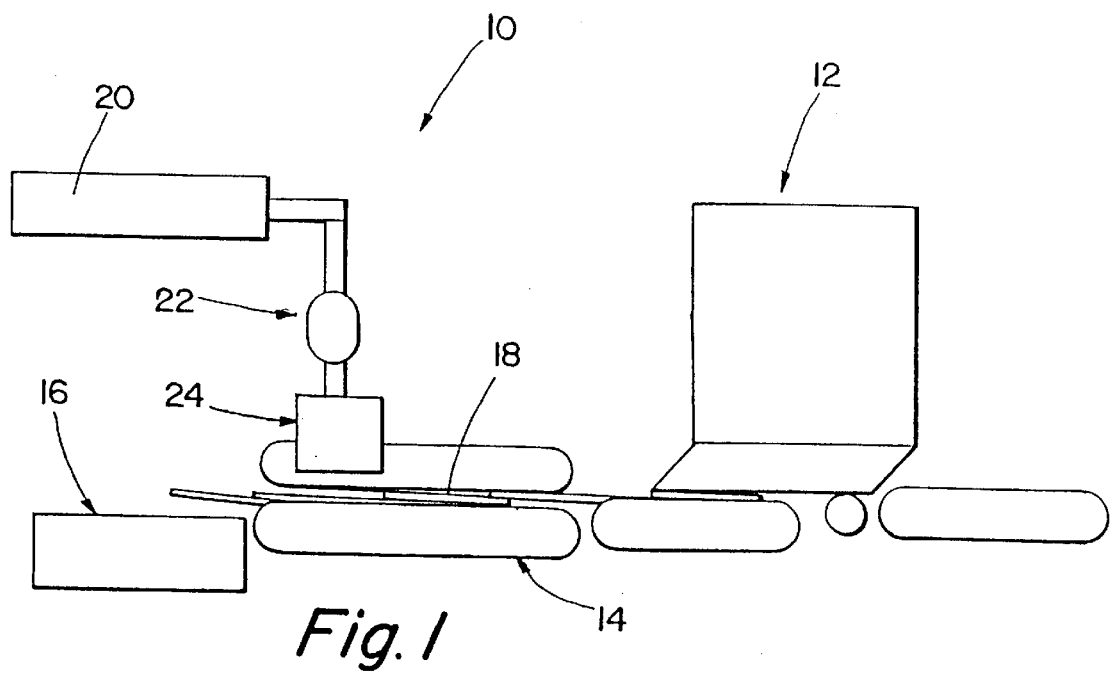
Fig. 1
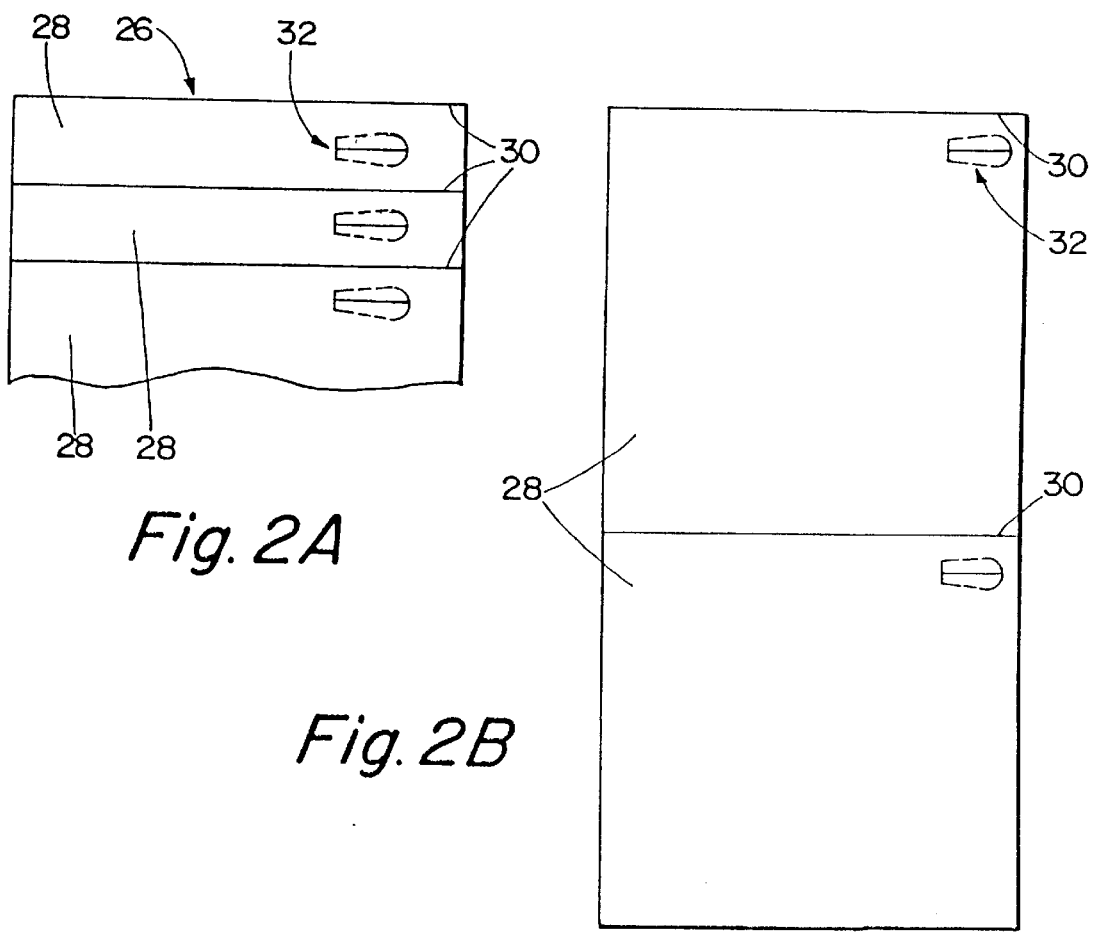
Fig. 2A
Fig. 2B

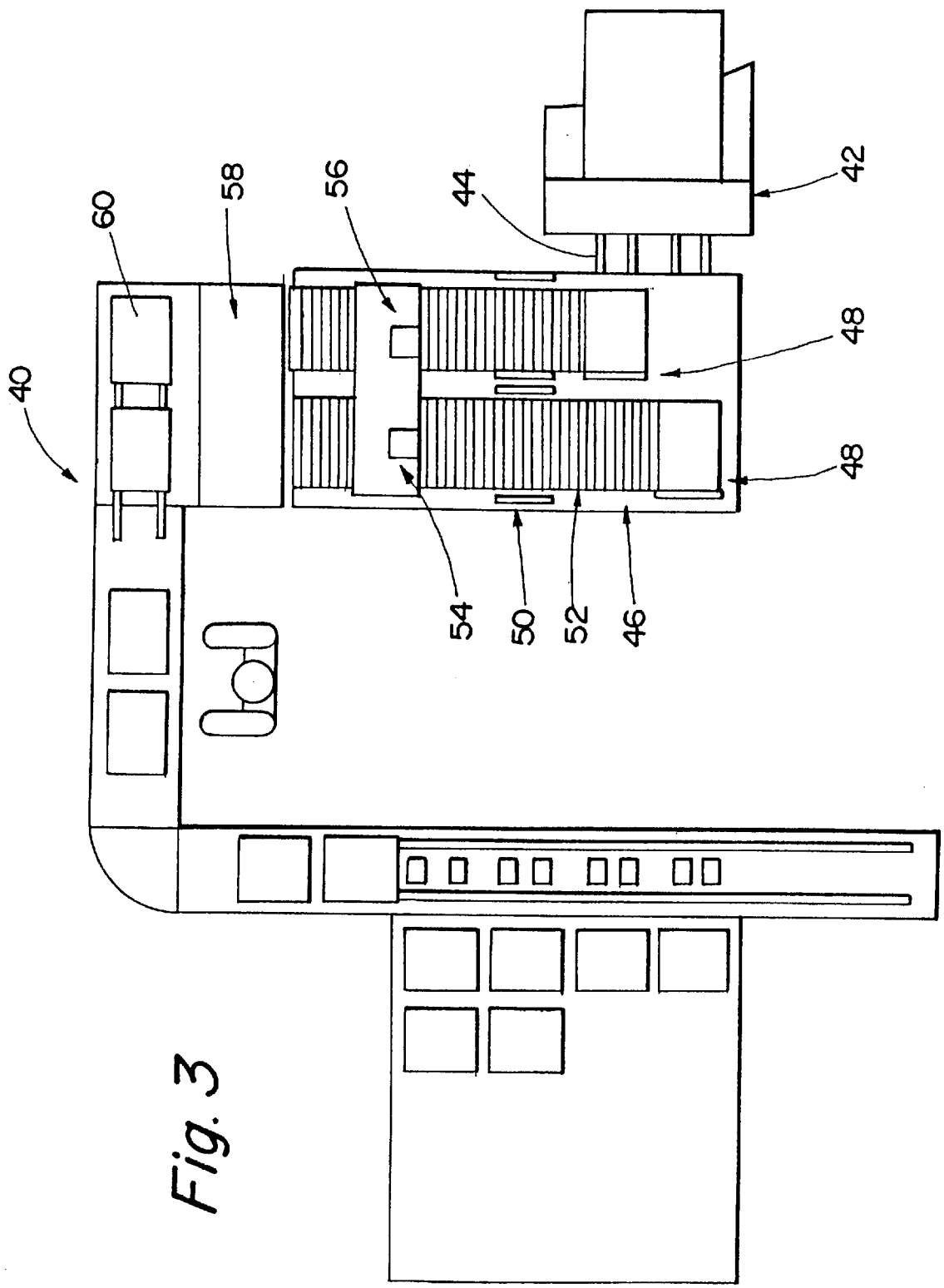

LASER PROCESSING OF DISCRETE SHEETS OF MATERIAL

This application is a continuation of U.S. patent application Ser. No. 08/902,237 filed Jul. 29, 1997, now U.S. Pat. No. 5,843,364 which is a continuation of U.S. patent application Ser. No. 08/541,047 filed Oct. 11, 1995, now U.S. Pat. No. 5,688,463 which is a continuation of U.S. patent application Ser. No. 08/489,547 filed Jun. 12, 1995, now abandoned.

BACKGROUND AND SUMMARY OF THE INVENTION

The present invention relates generally to a system for use in laser treating material and more particularly to a method and apparatus for rapidly providing half-cuts or score lines or various other laser treatments in material.

Many process systems known today use a continuous web feed of uncut material into a process. For example, in the packaging industry, a continuous web of material is fed through a printing system and later it is cut into individual packaging units to be folded into a desired package configuration. A newspaper printing press is another example of a continuous feed of material (i.e. paper) passing through a printing process, later to be cut into individual sections.

Of course, printing is not the only process that is incorporated into such systems, and paper is not the only kind of material that is continuously fed into such systems. Industry in general has applied many different processes to many different materials in continuous feed systems.

The ability to process on a web of material with a laser system requires that the power, tracking, and optics handle the requirements of full web speed. Conventional web system processes, such as that shown in U.S. Pat. No. 5,001,325, are characterized by high speeds which may require a large field of view in the web direction to allow for tracking and thus resulting in a longer focal length for the laser system. The greater the focal length requirements, the more powerful the laser system must be to process the material.

The present invention provides a process and system wherein shingled sheets of material are passed through a section where a laser system may treat the material. The source of the sheets may be a stack of sheets, or may be a web system sheeter output, or various other discrete material supply techniques. Shingling sheets of material slows the apparent speed of the material through the laser system processing area, relative to the overall web speed, and thus allows a smaller field of view for the laser system to track and perform its function. A higher percentage of overlap allows a slower conveyor speed and lowers the overall system requirements. In addition, in the case where the web repeat length is very large compared to the length required to be processed (i.e., 100 to 1) the amount of time to process can also be increased via shingling in that the field of view need only cover the 1% length while in the web case to have equivalent time to process the entire repeat (100%) need to be tracked. If less than the full repeat is tracked then the process time will be less (i.e., 50% track=½ the time available to process). These types of system trade offs significantly affect the power of the laser as well as the scan rates and effective power density at the work surface. Thus it can be seen that this technique allows one to significantly improve the efficiency of using the optimum advantages of the laser and its optical tracking systems.

As a result of the present invention, the power requirements of a laser system may be reduced. With the present invention, the lower power requirements permit the use of laser systems previously thought impracticable for such laser treating systems. Many $CO_2$ laser systems may now be used along with state of the art galvos systems having finite power handling capabilities.

Shingling allows the conveyor speed to be reduced dramatically. The speed of the shingled blanks riding on a conveyor can be reduced by a factor of 10 if a 90% overlap is used, as compared to the web speed. For example, if a web process running at 200 m/min., supplies a shingling system that has overlap of 90%, the shingling conveyor speed will be 20 m/min. This example assumes that the laser treatment to be performed is to be done on the 10% exposed surface.

Because the speed is reduced to 20 m/min. on the shingling system, it travels $\frac{1}{10}$ the distance during the cut cycle. Thus the galvo tracking distance need only be $\frac{1}{10}$ of what would be needed on a web system. This in turn allows the use of shorter focal lengths.

The shorter focal length is significant since it is directly proportional to the focused spot diameter. In this example, the galvo focal length is reduced by a factor of 10. This reduction in the spot diameter will have a large impact on the power densities achieved. Since the power density is related to the spot size area, any reduction in the spot diameter will increase power density by the square of the diameter change. The power requirements for the optics can also be decreased accordingly. In addition, the optic path (i.e., galvo, optics, mirrors) need only to carry this lower power requirement.

The present invention may be utilized to provide scores or cut lines in predetermined places in containers to contribute to the consumer-friendliness of a container. Such containers may be easily opened without the use of tools such as scissors or knives.

These and other advantages will be apparent from the following detailed description of the invention, drawings, and claims.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a schematic view of one embodiment of the present invention;

FIG. 2A is a plan view of a shingled stack of material cards of the present invention;

FIG. 2B is a plan view of a continuous web method of transporting material cards that are not yet cut;

FIG. 3 is a plan view of one embodiment of a card processing system of the present invention.

DETAILED DESCRIPTION OF PREFERRED EMBODIMENT(S)

Figure 4:
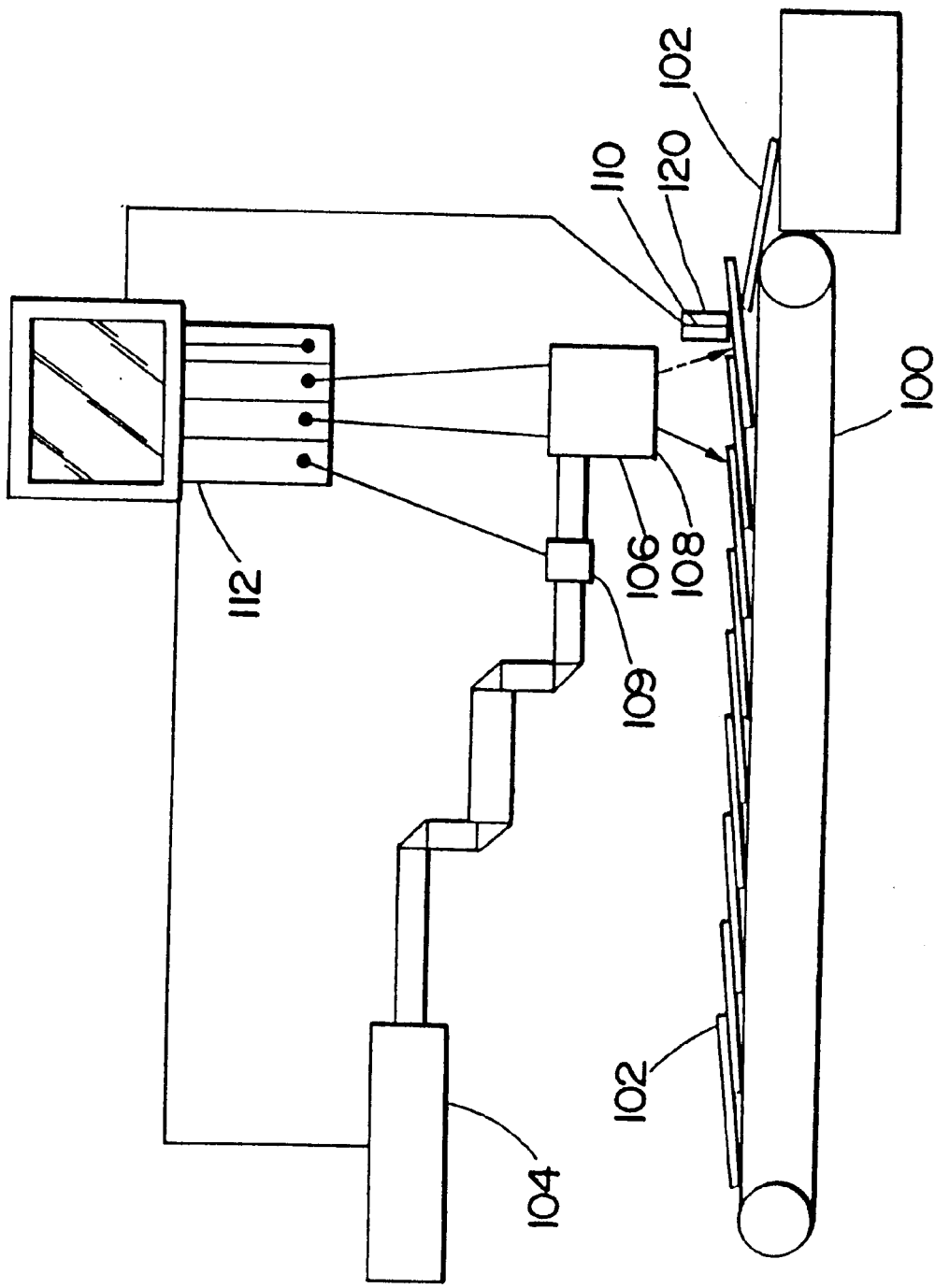
FIG. 4 is a schematic view of yet another embodiment of the present invention.

Referring to FIG. 1, a laser cutting system of the present invention is shown generally at 10. A stack of material cards 12 may be fed to a shingle transfer 14. This process can be implemented in any physical plane. The cards can be shingled at 90 degrees right or left to the web, or as well as in-line with the web. This allows for selective exposure of all edges of the card.

Shingle transfers are well known in the art and may be purchased from Multifold International of Milford, Ohio. An example of one shingle transfer sold by Multifold International is the Model 4026 TOTF (Turn Over Top Feeder). The shingle transfer 14 may shingle each individual card from the stack to expose a portion of a surface of each card and may then convey the shingled cards to another stack 16.

As the shingled cards 18 pass through the shingle transfer 14 a laser beam may be directed onto the surface of individual cards to cause local evaporation of material from the cards. A laser system 20 may generate a laser beam and supply it to a Z-axis focus 22. The laser beam then travels through two axis laser galvo 24, which may comprise X and Y axis positioning mirrors.

FIG. 2A shows a plan view of a portion of shingled cards 26. Each individual card may expose a portion of its surface 28 when shingled. Sensors may be utilized to detect a leading edge of each card 30 to trigger the laser system. Each individual card need only expose enough area to allow the laser beam to contact the area to be treated with the laser beam, as shown at 32.

FIG. 2B shows a plan view of a web of material. A print repeat may also be used to trigger a laser system to contact an area 32. In some systems the entire surface 28 of each repeat of material is exposed, and the entire surface must pass by before a new material piece can be started. In this case it can be seen that the process rate (i.e., number of cards per minute) would be the same, but that the time to process can be only equal if the laser and the galvo system is allowed to track the print repeat for its entire elapsed time, thus requiring a larger field of view equal to the print repeat.

Referring now to FIG. 3, a plan view of one embodiment of a laser system 40 of the present invention is shown. The material cards of the system of FIG. 3 may be comprised of multiple layers of different materials together forming each material card. Each card may have an inside surface and a printed side. A web of material may be supplied to a rotary knife 42 which cuts the web of material into individual cards. The cards may then be separated by splitter wheels 44 and supplied to a conveyor 46. In this embodiment the cards are shingled orthogonally to the web. The cards may abut stop plates 48 and pass by squaring plates 50 which position the cards as they are being conveyed. In the embodiment shown, the cards are shown with a printed side 52 facing upwards. A laser system 54 treats the cards while a shield and ventilation system 56 operates. The cards are then stacked and turned at station 58 where they may be turned over to have the printed side facing down 60.

Alternatively, in FIG. 4, a shingle conveyor 100 may convey cards 102 under a laser system which may comprise a laser 104, and a galvo 106 (plus a field flattening lens 108 in one embodiment or a z-axis focus lens 109 in another embodiment). A tachometer 110 may be used to provide a speed input to a control system 112 which allows the processor to track the cutting surface. The control system 112 starts the laser and guides the laser beam through its desired pattern by controlling the placement of galvo mirrors 106 in combination with z-axis focus compensation. A leading edge trigger 120 senses the leading edge of a card and provides a signal to initiate the lasering process. Upon receiving the signal, the control system 112 tracks the material via tachometer 110 signal and initiates lasering 104 and beam positioning 106. The field flattening lens (or in another embodiment, the z-axis focus lens) provides a means for enabling the laser beam to maintain focus over the galvos mirrors' entire field of view.

The discrete sheets of material may be shingled in a straight ahead, right side or left side orientation from the loading point to the shingling conveyor. If a web of material is cut into discrete sheets prior to the loading point, the discrete sheets may be rotated 90° and then conveyed. This arrangement allows for different edges of each sheet to be exposed to the laser.

The discrete sheets may also be conveyed at any angle past a laser system while the discrete sheets are vertically inclined or inclined in any plane through 360° rotation. The vertical arrangement (as well as other arrangements) still allows for shingling (overlap) of adjacent sheets and provides the same advantages as shingling the sheets in the horizontal plane.

EXAMPLE

To provide further understanding of the salient aspects of the present invention, a brief example of the advantages that may be achieved with the present invention is presented below. A hypothetical case has the following parameters:

| | |
|---|---|
| Web Speed | 200 meters/min |
| Print Repeat | .333 meters/part |
| Throughput | 600 parts/min (200 meters/min ÷ .333 meters/part) |
| Total Cycle Time | 100 miliseconds = .001667 min |
| Cut Time | 90 miliseconds = .00150 min |
| Galvo Reset Time | 10 miliseconds = .000167 min |
| Laser Cut Area | .033 m wide (across web) by .033 m long (web direction) |
| Galvo Max Angle | plus or minus 15 degrees |
| Laser Power | 200 watts |

Shingling Conveyor Speed

In this example, the web is cut into blanks and the blanks are transferred to a shingling conveyor. The shingled blanks would need to have an exposed area of 0.033 m (90% overlap). It can be shown that the resultant shingling conveyor speed would be reduced by a factor of ten (10):

| | |
|---|---|
| Conveyor Speed | = (Exposed Surface × Parts per min) |
| | = (0.033 m exposed surface per part) × |
| | (600 parts per min) |
| | = 20 m/min (vs. web speed of 200 m/min) |

Field of View

In order to maximize the cut time in a web system, the laser system would track the part during the cut time.

| | |
|---|---|
| Web Tracking Distance | = Web Speed × Laser Cut Time |
| | = 200 m/min × .0015 min = .3 m |

Thus, the field of view for a web system would need to be 0.3 m while the work area is only 0.033 m.

Likewise, in a shingling system the laser system would track the part during the cut time. This can be shown mathematically:

| | |
|---|---|
| Shingling Tracking Distance | = Conveyor Speed × Laser Cut Time |
| | = 20 m/min × .0015 min. = .03 m |

The field of view for a shingling system is reduced to 0.033 m.

Focal Length

The focal length for a given field of view can be calculated as follows:

Focal Length=Field of view÷2×Inv Tan 15 degrees

Focal Length for Web System Focal Length=0.562 m

Focal Length for Shingling System=0.056 m

Hence, the focal length reduction on a shingling system is a factor of 10.

Spot Diameter

The spot diameter is directly proportional to the focal length as shown in the following formula:

$$\text{Spot Diameter Typ.} = 4L \times f \div \pi \times W \text{(in microns)}$$

This relationship can be reviewed in more detail in the text of "Basics of Laser Machining Theory and Practice" by George Chryssolouris.

Where:

Wave Length (L) In Microns is 10.6 for CO2 laser.

Focal Length (f) in Millimeters is 567 for the Web System and 56.7 for the Shingling System.

Beam Diameter (W) In Millimeters is 30 for either system

The respective spot diameters are as follows:

Web System Spot Diameter=253 microns

Shingling System Spot Diameter=25 microns

Thus, the shingle system has a smaller spot due to the shorter focal length. The overall focused spot diameter is reduced by a factor of 10.

Power Density

The power density of the shingling system is increased significantly over the web system power density:

Web System Power Density=Laser Power÷Spot Area= 0.40 MW/cm2

Shingling System Power Density=Laser Power÷Spot Area=40 MW/cm2

The power density for the shingling system is increased by a factor of 100 times.

END OF EXAMPLE

The present invention has been described with reference to several embodiments and an example, but it is to be recognized that several modifications and variations to the invention could be made and fall within the scope of the subjoined claims.

What is claimed is:

1. A process for laser treating material, said process comprising the steps of:

shingling discrete sheets of said material, such that each of said discrete sheets of material overlaps a portion of an adjacent one of said discrete sheets of material;

moving each of said discrete sheets in a pre-determined path such that said discrete sheets pass in succession through the view of a laser system; and directing a laser beam from said laser system onto said discrete sheets in succession.

2. The process of claim 1 wherein said laser beam is directed only onto an exposed portion of each discrete sheet.

3. The process of claim 1 wherein said laser beam is directed onto said discrete sheets one sheet at a time.

4. The process of claim 1 wherein said discrete sheets are continuously moving.

5. The process of claim 1 wherein the number of said discrete sheets is at least three.

6. The process of claim 1 further comprising providing a discrete sheet leading edge detector for triggering said laser system.

7. The process of claim 1 wherein said discrete sheets are moved on a conveyor.

8. The process of claim 1 further comprising providing a stack of pre-cut discrete sheets of said material.

9. The process of claim 1 further comprising:

providing a material web sheeter apparatus having a web; and cutting said web into said discrete sheets of said material.

10. The process of claim 1 wherein a surface speed measuring device provides data input to said laser system which allows tracking of said discrete sheets during said moving.

11. The process of claim 1 wherein said directing of said laser beam includes providing an x-y galvo beam director system with fixed or dynamic z-axis compensation.

* * * * *